(12) United States Patent
Katz et al.

(10) Patent No.: US 10,173,128 B2
(45) Date of Patent: *Jan. 8, 2019

(54) GAMES, AND METHODS FOR IMPROVED GAME PLAY IN GAMES OF CHANCE AND GAMES OF SKILL

(71) Applicant: MILESTONE ENTERTAINMENT LLC, Beverly Hills, CA (US)

(72) Inventors: Randall M. Katz, Beverly Hills, CA (US); Gary Dawson, Thousand Oaks, CA (US); Andrew Felsher, Calabasas, CA (US)

(73) Assignee: MILESTONE ENTERTAINMENT LLC, Beverly Hills, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/330,138

(22) Filed: Jul. 14, 2014

(65) Prior Publication Data

US 2016/0008707 A1 Jan. 14, 2016
US 2017/0189795 A9 Jul. 6, 2017

Related U.S. Application Data

(63) Continuation of application No. 13/169,997, filed on Jun. 27, 2011, now Pat. No. 8,794,630, which is a
(Continued)

(51) Int. Cl.
*A63F 9/24* (2006.01)
*A63F 9/18* (2006.01)
(Continued)

(52) U.S. Cl.
CPC ............ *A63F 9/183* (2013.01); *A63F 3/0605* (2013.01); *A63F 13/46* (2014.09); *A63F 13/65* (2014.09);
(Continued)

(58) Field of Classification Search
CPC .......... A63F 13/12; A63F 9/183; A63F 13/497
See application file for complete search history.

(56) References Cited

U.S. PATENT DOCUMENTS 3,825,255 A 7/1974 Kennard et al.
3,873,092 A 3/1975 Fagan
(Continued)

FOREIGN PATENT DOCUMENTS

WO WO 99/11008 A2 3/1999
WO WO 01/03786 A1 1/2001
(Continued)

OTHER PUBLICATIONS

Finders Keepers, 1996 (retrieved from www.stewarttelevision.com on Feb. 25, 2004).
(Continued)

*Primary Examiner* — Steve Rowland
(74) *Attorney, Agent, or Firm* — David B. Murphy; O'Melveny & Myers LLP (57) ABSTRACT

A variety of games and methods for enhancing game play are provided. In one aspect, a secondary or ancillary game is played in parallel with a first game, such as a lottery ball draw. Yet another embodiment of game play provides for the repurposing of an existing taped game show. The previously recorded game show would be segmented into subsets of issues, for example, presentation of questions or answers (as in the case of Jeopardy), those issues would be presented to one or more players, a response would be received from those players, and the answer would be compared to the correct answer. Scoring would then rank players relative to one another or to indicate the amount of the prize.

13 Claims, 3 Drawing Sheets

```
         60 Second  45  Millionaire
        ┌────┬────┬────┬────┬────┐
        │ AT │ BT │ CT │ DT │ ET │
        ├────┼────┼────┼────┼────┤
        │ FT │ GT │ HT │ IT │ JT │
        ├────┼────┼────┼────┼────┤
        │ KT │ LT │ MT │ NT │ OT │
        ├────┼────┼────┼────┼────┤
        │ PT │ QT │ RT │ ST │ TT │
        ├────┼────┼────┼────┼────┤
        │ UT │ VT │ WT │ XT │ YT │
        └────┴────┴────┴────┴────┘
```

Related U.S. Application Data continuation of application No. 12/545,526, filed on Aug. 21, 2009, now Pat. No. 7,967,292, which is a continuation of application No. 10/394,080, filed on Mar. 21, 2003, now abandoned, which is a continuation of application No. 09/585,987, filed on Jun. 2, 2000, now Pat. No. 6,565,084.

(51) Int. Cl.
  *A63F 3/06* (2006.01)
  *A63F 13/65* (2014.01)
  *A63F 13/46* (2014.01)

(52) U.S. Cl.
  CPC ... *A63F 2250/64* (2013.01); *A63F 2300/8064* (2013.01)

(56) References Cited

U.S. PATENT DOCUMENTS

| | | |
|---|---|---|
| 4,348,027 A | 9/1982 | Escamilla-Kelly |
| 4,582,324 A | 4/1986 | Koza et al. |
| 4,772,025 A | 9/1988 | James et al. |
| 4,836,546 A | 6/1989 | DiRe et al. |
| 4,856,787 A | 8/1989 | Itkis |
| 4,883,278 A | 11/1989 | Scott |
| 4,943,090 A | 7/1990 | Fienberg |
| 5,035,422 A | 7/1991 | Berman |
| 5,046,737 A | 9/1991 | Fienberg |
| 5,074,566 A | 12/1991 | Desbiens |
| 5,112,050 A | 5/1992 | Koza et al. |
| 5,116,049 A | 5/1992 | Sludikoff et al. |
| 5,157,602 A | 10/1992 | Fields et al. |
| 5,158,293 A | 10/1992 | Mullins |
| 5,269,521 A | 12/1993 | Rossides |
| 5,271,626 A | 12/1993 | Llenas et al. |
| 5,317,135 A | 5/1994 | Finocchio |
| 5,407,199 A | 4/1995 | Gumina |
| 5,409,225 A | 4/1995 | Kelly et al. |
| 5,409,234 A | 4/1995 | Bechter |
| 5,417,424 A | 5/1995 | Snowden et al. |
| 5,472,196 A | 12/1995 | Rusnak |
| 5,475,205 A | 12/1995 | Behm et al. |
| 5,499,816 A | 3/1996 | Levy |
| 5,513,852 A | 5/1996 | Robinson |
| 5,518,253 A | 5/1996 | Pocock et al. |
| 5,569,082 A | 10/1996 | Kaye |
| 5,569,512 A | 10/1996 | Brawner et al. |
| 5,620,182 A | 4/1997 | Rossides |
| 5,628,684 A | 5/1997 | Bouedec |
| 5,643,088 A | 7/1997 | Vaughn et al. |
| 5,651,735 A | 7/1997 | Baba |
| 5,655,961 A | 8/1997 | Acres et al. |
| 5,685,541 A | 11/1997 | Lovell, Sr. |
| D387,390 S | 12/1997 | Seiler |
| 5,697,844 A | 12/1997 | Von Kohorn |
| 5,709,603 A | 1/1998 | Kaye |
| 5,721,583 A | 2/1998 | Harada et al. |
| 5,772,510 A | 6/1998 | Roberts |
| 5,772,511 A | 6/1998 | Smeltzer |
| 5,779,549 A | 7/1998 | Walker et al. |
| 5,785,315 A | 7/1998 | Eiteneer et al. |
| 5,791,990 A | 8/1998 | Schroeder et al. |
| 5,795,228 A | 8/1998 | Trumbull et al. |
| 5,813,913 A | 9/1998 | Berner et al. |
| 5,816,918 A | 10/1998 | Kelly et al. |
| 5,842,921 A | 12/1998 | Mindes et al. |
| 5,855,514 A | 1/1999 | Kamille |
| 5,857,175 A | 1/1999 | Day et al. |
| 5,871,398 A | 2/1999 | Schneier et al. |
| 5,909,875 A | 6/1999 | Weingardt |
| 5,916,024 A | 6/1999 | Von Kohorn |
| 5,931,467 A | 8/1999 | Kamille |
| 5,934,671 A | 8/1999 | Harrison |
| 5,935,001 A | 8/1999 | Baba |
| 5,936,661 A | 8/1999 | Trew |
| 5,937,380 A | 8/1999 | Segan |
| 5,949,042 A | 9/1999 | Dietz, II et al. |
| 5,971,855 A | 10/1999 | Ng |
| 6,012,983 A | 1/2000 | Walker et al. |
| 6,015,344 A | 1/2000 | Kelly et al. |
| D420,057 S | 2/2000 | Colombo |
| 6,024,640 A | 2/2000 | Walker et al. |
| 6,024,641 A | 2/2000 | Sarno |
| 6,048,268 A | 4/2000 | Humble |
| 6,070,872 A | 6/2000 | Squitieri |
| 6,077,163 A | 6/2000 | Walker et al. |
| 6,080,062 A | 6/2000 | Olson |
| 6,086,477 A | 7/2000 | Walker et al. |
| 6,102,395 A | 8/2000 | Such |
| 6,102,400 A | 8/2000 | Scott et al. |
| 6,168,521 B1 | 1/2001 | Luciano et al. |
| 6,193,610 B1 | 2/2001 | Junkin |
| 6,203,011 B1 | 3/2001 | Nulph |
| 6,234,896 B1 | 5/2001 | Walker et al. |
| 6,238,288 B1 | 5/2001 | Walker et al. |
| 6,240,555 B1 | 5/2001 | Shoff et al. |
| 6,241,246 B1 | 6/2001 | Guttin et al. |
| 6,241,606 B1 | 6/2001 | Riendeau et al. |
| 6,244,957 B1 | 6/2001 | Walker et al. |
| 6,250,685 B1 | 6/2001 | Walker et al. |
| 6,251,017 B1 | 6/2001 | Leason et al. |
| D444,507 S | 7/2001 | Lundberg |
| 6,267,376 B1 | 7/2001 | Jenkins |
| 6,273,817 B1 | 8/2001 | Sultan |
| 6,273,820 B1 | 8/2001 | Haste, III |
| 6,277,026 B1 | 8/2001 | Archer |
| RE37,371 E | 9/2001 | Gerow |
| 6,290,600 B1 | 9/2001 | Glasson |
| 6,293,865 B1 | 9/2001 | Kelly et al. |
| 6,306,035 B1 | 10/2001 | Kelly et al. |
| 6,309,298 B1 | 10/2001 | Gerow |
| 6,312,334 B1 | 11/2001 | Yoseloff |
| 6,319,127 B1 | 11/2001 | Walker et al. |
| 6,322,446 B1 | 11/2001 | Yacenda |
| 6,354,593 B1 | 3/2002 | Frommer et al. |
| 6,382,627 B1 | 5/2002 | Lundberg |
| 6,424,703 B1 | 7/2002 | Katz |
| 6,435,500 B2 | 8/2002 | Gumina |
| 6,443,452 B1 | 9/2002 | Brune |
| 6,443,840 B2 | 9/2002 | Von Kohorn |
| 6,446,964 B1 | 9/2002 | Kelly et al. |
| 6,454,648 B1 | 9/2002 | Kelly et al. |
| 6,475,085 B2 | 11/2002 | Moody |
| 6,488,280 B1 | 12/2002 | Katz et al. |
| 6,491,215 B1 | 12/2002 | Irwin, Jr. et al. |
| 6,497,408 B1 | 12/2002 | Walker et al. |
| 6,514,144 B2 | 2/2003 | Riendeau et al. |
| 6,547,242 B1 | 4/2003 | Sugiyama et al. |
| 6,565,084 B1 | 5/2003 | Katz et al. |
| 6,569,017 B2 | 5/2003 | Enzminger et al. |
| 6,602,135 B1 | 8/2003 | Gerrard |
| 6,607,439 B2 | 8/2003 | Schneier et al. |
| 6,634,942 B2 | 10/2003 | Walker et al. |
| 6,656,042 B2 | 12/2003 | Reiss et al. |
| 6,663,105 B1 | 12/2003 | Sullivan et al. |
| 6,676,522 B2 | 1/2004 | Rowe et al. |
| 6,749,198 B2 | 6/2004 | Katz et al. |
| 6,749,500 B1 | 6/2004 | Nelson et al. |
| 6,758,755 B2 | 7/2004 | Kelly et al. |
| 6,811,484 B2 | 11/2004 | Katz et al. |
| 6,824,469 B2 | 11/2004 | Allibhoy et al. |
| 6,908,382 B2 | 6/2005 | Walker et al. |
| 6,939,229 B2 | 9/2005 | McClintic |
| 6,941,135 B2 | 9/2005 | Minear et al. |
| 6,969,317 B2 | 11/2005 | Walker et al. |
| 6,988,732 B2 | 1/2006 | Vancura |
| 6,994,625 B2 | 2/2006 | Falciglia, Sr. |
| 7,008,317 B2 | 3/2006 | Cote et al. |
| 7,052,010 B2 | 5/2006 | Katz et al. |
| 7,054,928 B2 | 5/2006 | Segan et al. |
| 7,140,964 B2 | 11/2006 | Walker et al. |
| 7,156,739 B2 | 1/2007 | Walker et al. |
| 7,163,459 B2 | 1/2007 | Tanskanen |

(56) References Cited

U.S. PATENT DOCUMENTS

| | | |
|---|---|---|
| 7,181,690 B1 | 2/2007 | Leahy et al. |
| 7,186,180 B2 | 3/2007 | Lathrop et al. |
| 7,194,542 B2 | 3/2007 | Segan et al. |
| 7,204,756 B2 | 4/2007 | Jubinville et al. |
| 7,285,048 B2 | 10/2007 | Karmarkar |
| 7,309,280 B2 | 12/2007 | Toyoda |
| 7,322,885 B1 | 1/2008 | Luciano, Jr. et al. |
| 7,331,860 B2 | 2/2008 | Herrmann et al. |
| 7,357,715 B2 | 4/2008 | Kane |
| 7,374,484 B2 | 5/2008 | Bennett, III |
| 7,398,225 B2 | 7/2008 | Voltmer et al. |
| 7,404,764 B2 | 7/2008 | Bozeman |
| 7,422,213 B2 | 9/2008 | Katz et al. |
| 7,470,186 B2 | 12/2008 | Cannon |
| 7,510,116 B2 | 3/2009 | Robb et al. |
| 7,533,885 B2 | 5/2009 | Nicely et al. |
| 7,546,411 B2 | 6/2009 | Bruner et al. |
| 7,611,065 B2 | 11/2009 | Behm et al. |
| 7,621,810 B2 | 11/2009 | Gilmore et al. |
| 7,631,871 B2 | 12/2009 | Bozeman |
| 7,634,864 B2 | 12/2009 | Segan et al. |
| 7,645,194 B2 | 1/2010 | Van Luchene |
| 7,654,529 B2 | 2/2010 | Rogers |
| 7,662,038 B2 | 2/2010 | Bozeman |
| 7,666,082 B2 | 2/2010 | Kane et al. |
| 7,666,084 B2 | 2/2010 | Herrmann et al. |
| 7,666,095 B2 | 2/2010 | Van Luchene |
| 7,686,691 B2 | 3/2010 | Van Luchene |
| 7,726,652 B2 | 6/2010 | Jubinville et al. |
| 7,734,251 B1 | 6/2010 | Harvey et al. |
| 7,749,066 B2 | 7/2010 | Hartman et al. |
| 7,753,774 B2 | 7/2010 | Gail et al. |
| 7,753,789 B2 | 7/2010 | Walker et al. |
| 7,756,742 B2 | 7/2010 | Gilmore et al. |
| 7,766,739 B2 | 8/2010 | Kane et al. |
| 7,766,740 B2 | 8/2010 | Penrice |
| 7,771,264 B2 | 8/2010 | Kane et al. |
| 7,785,193 B2 | 8/2010 | Paulsen et al. |
| 7,785,195 B2 | 8/2010 | Palmer et al. |
| 7,794,324 B2 | 9/2010 | White et al. |
| 7,797,717 B1 | 9/2010 | Harvey et al. |
| 7,798,896 B2 | 9/2010 | Katz et al. |
| 7,815,502 B2 | 10/2010 | Hardy et al. |
| 7,819,747 B2 | 10/2010 | Kane et al. |
| 7,860,131 B1 | 12/2010 | Harvey et al. |
| 7,871,327 B2 | 1/2011 | Walker et al. |
| 7,896,735 B2 | 3/2011 | Kelly et al. |
| 7,908,638 B1 | 3/2011 | Harvey et al. |
| 7,914,374 B2 | 3/2011 | Walker et al. |
| 7,934,986 B2 | 5/2011 | Kane et al. |
| 7,945,856 B2 | 5/2011 | Leahy et al. |
| 7,955,169 B2 | 6/2011 | Walker et al. |
| 7,959,502 B2 | 6/2011 | Kane et al. |
| 7,967,292 B2 | 6/2011 | Katz et al. |
| 7,976,374 B2 | 7/2011 | Kane et al. |
| 7,980,942 B2 | 7/2011 | Kane et al. |
| 7,988,551 B2 | 8/2011 | Walker et al. |
| 8,002,630 B2 | 8/2011 | Nguyen et al. |
| 8,012,013 B2 | 9/2011 | Walker et al. |
| 8,016,668 B2 | 9/2011 | Hardy et al. |
| 8,025,567 B2 | 9/2011 | Kane et al. |
| 8,029,361 B2 | 10/2011 | Hardy et al. |
| 8,038,529 B2 | 10/2011 | Kane et al. |
| 8,046,256 B2 | 10/2011 | Chien et al. |
| 8,047,907 B2 | 11/2011 | Kane et al. |
| 8,075,386 B1 | 12/2011 | Leake |
| 8,075,387 B2 | 12/2011 | Meyer et al. |
| 8,082,501 B2 | 12/2011 | Leahy et al. |
| 8,083,583 B2 | 12/2011 | Bennett, III et al. |
| 8,109,828 B2 | 2/2012 | Kane et al. |
| 8,118,660 B2 | 2/2012 | Pace |
| 8,137,178 B2 | 3/2012 | Lind et al. |
| 8,147,325 B2 | 4/2012 | Kane et al. |
| 8,157,630 B2 | 4/2012 | Herrmann et al. |
| 8,206,210 B2 | 6/2012 | Walker et al. |
| 8,241,100 B2 | 8/2012 | Katz et al. |
| 8,241,110 B2 | 8/2012 | Katz et al. |
| 8,287,351 B2 | 10/2012 | Boykin et al. |
| 8,290,816 B2 | 10/2012 | Whiteman et al. |
| 8,308,162 B2 | 11/2012 | Rogers |
| 8,376,826 B2 | 2/2013 | Katz et al. |
| 8,393,946 B2 | 3/2013 | Katz et al. |
| 8,425,297 B2 | 4/2013 | Kane et al. |
| 8,425,300 B2 | 4/2013 | Kane et al. |
| 8,460,081 B2 | 6/2013 | Meyer |
| 8,529,336 B2 | 9/2013 | Katz et al. |
| 8,535,134 B2 | 9/2013 | Katz et al. |
| 8,626,582 B2 | 1/2014 | Ariff et al. |
| 8,696,431 B2 | 4/2014 | Safaei et al. |
| 8,696,432 B2 | 4/2014 | Kane et al. |
| 8,708,814 B2 | 4/2014 | Kane et al. |
| 8,727,853 B2 | 5/2014 | Katz et al. |
| 8,727,867 B2 | 5/2014 | Kane et al. |
| 8,794,630 B2 | 8/2014 | Katz et al. |
| 8,795,071 B2 | 8/2014 | Katz et al. |
| 8,808,080 B2 | 8/2014 | Meyer |
| 2001/0003099 A1* | 6/2001 | Von Kohorn ........ H04N 7/0884 463/40 |
| 2003/0045340 A1 | 3/2003 | Roberts |
| 2003/0189288 A1 | 10/2003 | Katz et al. |
| 2005/0096117 A1 | 5/2005 | Katz et al. |
| 2005/0250569 A1 | 11/2005 | Kane et al. |
| 2006/0025197 A1 | 2/2006 | Kane et al. |
| 2006/0105837 A1 | 5/2006 | Walker et al. |
| 2006/0248025 A1 | 11/2006 | Walker et al. |
| 2006/0251383 A1* | 11/2006 | Vronay ................ G11B 27/034 386/242 |
| 2007/0259710 A1 | 11/2007 | Walker et al. |
| 2008/0009340 A1 | 1/2008 | Walker et al. |
| 2009/0011812 A1 | 1/2009 | Katz et al. |
| 2009/0061980 A1 | 3/2009 | Holton et al. |
| 2009/0117966 A1 | 5/2009 | Rogers et al. |
| 2010/0227675 A1 | 9/2010 | Luxton et al. |
| 2011/0218025 A1 | 9/2011 | Katz et al. |
| 2012/0174145 A1* | 7/2012 | Frazier ................... H04H 60/33 725/14 |
| 2013/0045784 A1 | 2/2013 | Napolitano |
| 2013/0084957 A1* | 4/2013 | Davis .................. G07F 17/3262 463/25 |
| 2014/0155132 A1 | 6/2014 | Katz et al. |
| 2014/0155133 A1 | 6/2014 | Katz et al. |
| 2014/0228088 A1 | 8/2014 | Katz et al. |
| 2014/0243066 A1 | 8/2014 | Coutts |

FOREIGN PATENT DOCUMENTS

| | | |
|---|---|---|
| WO | WO 01/42968 A1 | 6/2001 |
| WO | WO 01/76704 A2 | 10/2001 |

OTHER PUBLICATIONS

IGDA Online Games White Paper, Full Version, presented at the Game Developers Conference 2002 ,pp. title, i-iv, 1-63.

IGDA Online Games White Paper, $2^{nd}$ edition, Mar. 2003, pp. 1-140.

IGDA Web and Downloadable Games White Paper, presented at the Game Developers Converence 2004 by the IGDA Online Games SIG, pp. 1-93.

IGDA 2004 Persistent Worlds Whitepaper, presented by the IGDA Online Games SIG, pp. 1-82.

IGDA 2005 Casual Games White Paper, pp. 1-125.

IGDA Mobile Games White Paper, presented at the Game Developers Conference 2005 by the IGDA Online Games Sig, pp. 1-55.

Top That II, 1996 (retrieved from www.stewarttelevision.com on Feb. 25, 2004).

$10,000 Championship, one version for $50,000 broadcast in 1996 (retrieved from www.stewarttelevision.com on Feb. 25, 2004).

Schwartz, et al., The Encyclopedia of TV Game Shows, $3rd^d$ Edition, 1999, pp. 22-23, 48-49, 90, 98-99, 176-180.

(56) References Cited

OTHER PUBLICATIONS www.geocities.com/TelevisionCity/1856/rules.htm, Card Sharks, Apr. 24, 1978, 1-3.

* cited by examiner

GAMES, AND METHODS FOR IMPROVED GAME PLAY IN GAMES OF CHANCE AND GAMES OF SKILL

PRIORITY CLAIM

This is a continuation of U.S. application Ser. No. 13/169,997, filed Jun. 27, 2011, now U.S. Pat. No. 8,794,630; which is a continuation of U.S. application Ser. No. 12/545,526, filed Aug. 21, 2009, now U.S. Pat. No. 7,967,292; which is a continuation of U.S. application Ser. No. 10/394,080, filed Mar. 21, 2003, now abandoned; which is a continuation of U.S. application Ser. No. 09/585,987, filed Jun. 2, 2000, now U.S, Pat. No. 6,565,084, the contents of which are incorporated by reference herein in their entirety as if fully set forth herein.

FIELD OF THE INVENTION

These inventions relate to methods, an apparatus for their implementation, of unique player participation games, and for improved methods of play for games of skill and games of chance. More particularly, these inventions relate to new and improved games involving player participation in a broadcast medium, such as television, and in other communication medium, such as over the internet or other communications network.

BACKGROUND OF THE INVENTION

Play or participation games fall broadly under the categories of games of chance and games of skill. One of the main forms of games of chance are lotteries. By definition, a lottery involves the three elements of: 1) prize, 2) chance and 3) consideration. If these three elements are present, then the game is considered to be a lottery, and is typically then run by a governmental entity. In the United States, lotteries are typically run by the individual states, or collectively by a group of states. In other countries, it is typically the national government which runs the lottery. Countries and states attempt to strictly limit the game play to their geographic boundaries. For example, in Austria, while electronic access to the game may be available over the internet, or in order to play, the person must have a bank account in Austria, and be able to navigate the non-english menu.

Games have been conducted in any of a number of formats. Certainly, live, in person games have been performed. Yet other games have been played and broadcast over a broadcast medium, such as radio or television. Yet other games have been played through a more active communication medium, such as the telephone, or over a communication network such as the internet.

Various attempts have been made to provide game play over the internet. By way of example, the game show Jeopardy has been placed on the web at http://www.sony.com.

Various other attempts have been made to extend the general concept of gambling to broad communication media, such as the internet. For example, U.S. Pat. No. 5,800,268 entitled, "Method of Participating in a Live Casino Game from a Remote Location" has been asserted in a litigation in against an off shore corporation. The '268 patent discloses a system in which a player may participate in a live casino game from a location remote from the casino. A player interface station, such as a computer terminal or other special input device, is connected by a communication line to the casino. A second communication line is established from the casino to the player's financial institution. The player is presented with an image of an actual "live" game. The player then participates directly as if they were physically present at the casino. A wager is cleared with the players financial institution to insure adequate resources to cover the bet.

U.S. Pat. No. 4,845,739 to Ronald A. Katz is entitled, "Telephonic-Interface Statistical Analysis System". The patent describes various operating formats, including a format to be performed in association with television media. Specifically, in one embodiment, a real-time format is provided in which television viewers participate on a real-time basis in a game show for prizes. Expanded audience participation is achieved. Various levels of qualification are provided, such as where a child's television game format is utilized, parental clearance may be required. The use of personal identification numbers (pin numbers) is disclosed. In one implementation, the caller is prompted to identify which of the actual studio audience participants the caller will be aligned with. Additionally, the caller may be instructed to indicate the extent of a wager. As the game progresses, the individual player's accounts are credited or debited, thereby providing on-going accounting data. In yet another implementation, a non real-time operation is provided. Such a show might involve a quiz for callers based on their ability to perceive and remember occurrences within the show. Pre-registration is optionally utilized. In this implementation, a sequence or time clock would be utilized in order to limit or control individual interfaces to a specific time or geographic "window". In this way, the caller questions may be utilized across various time zones without the caller having obtained the question earlier than other callers within a given time zone.

Berman, U.S. Pat. No. 5,108,115 discloses a game show and method entitled "Interactive Game Show and Method for Achieving Interactive Communication Therewith". An interactive communication system is provided which permits individuals to electronically select at least one possible outcome of a plurality of outcomes of a future event. Successful contestants possibly share in a prize award associated with the event. A home audience of a televised game show may electronically communicate a series of random numbers using their touch tone telephone to participate in the show.

Recently, various governmental entities and trade organization have addressed the issue of game play over the internet. Senator Kyl has introduced a bill which would preclude the offering of internet based gaming, though permitting states to offer internet gambling. Consideration has been given to requiring that the state sponsored gaming be limited to an intranet, in an effort to limit those participating to persons physically resident within the states boundaries. Various international lottery organizations have promoted similar restrictions, namely, precluding the individuals offering of games of chance, and reserving that option exclusively to the state.

Various lottery formats are known to the art. In one classic format, a pre-determined number of tickets are provided with certain printed matter, such as numbers or other indicia, where the information is then obscured by a scratch off layer. By removing the layer and revealing the underlying information, the ticket holder may determine whether they have won or not. Various extensions have been made to a "virtual" scratch off ticket where no physical ticket is provided.

A conventional lottery proceeds as follows. First, a series of numbers are selected, either by the player or by some automated selection system, such as by computer. Upon the occurrence of a pre-determined event, such as on a set date and time, numbers are randomly chosen. Both mechanical methods, such as selection of ping-pong balls bearing numeric designations, or electronic means such as through a random number generator, may be utilized. The selected numbers are then provided to the participants, such as through a broadcast medium like newspapers, radio and television. Finally, the holder or holders of winning tickets then present their ticket for payment.

In yet another aspect of game play, a typical television presented game show lasts on the order of one half hour. Various shorter format games or shows have been utilized, for example, a football based advertisement or game has been presented by IBM during televised football games under the name "You Make The Call". Yet other shorter version games have been presented over web TV or on the Game Show Network.

Despite the wide spread participation in various forms of game play, as well as the suggestions for implementing those games on a mass communication network, such as through the telephone or internet, the possibility for new games, or improved game play exists.

SUMMARY OF THE INVENTION

Various interactive game show formats and methods for game play are provided. In one embodiment, a second or ancillary game is played in parallel with a first or primary game. By way of example, in association with a first game comprising a lottery number ball draw, a second game may involve a selected player's guessing whether the next ball draw will be of a higher or lower number, or odd or even or the like.

Various aspects of enhanced game play and novel games are disclosed. In a first aspect, the game play method and system provides for the playing or running of a parallel game or ancillary game along with a first or primary game. For example, during the real time ball draw for a lottery, the improved game play would involve running a parallel or ancillary game along with the ball draw. One implementation would involve a first ball draw, followed then by game play by a contestant such as predicting whether the next ball drawn would be of a higher or lower number, or would be odd or even.

In one implementation, the master of ceremonies would advise the player which of these options had a better probability of being the outcome, thereby making the ancillary game more a game of chance as opposed to a game of skill. Optionally, scoring may be done, such as where one player or audience participant is scored or ranked relative to another player or participant.

In yet another aspect, the game play includes the use of contestant game play to determine lottery numbers. For example, a contestant may be blind folded or otherwise be made unable to see various options. The person then selects from among the various options as the means by which the random lottery numbers are drawn. One example could comprise a blind folded contestant selecting objects.

In yet another aspect, this invention relates to an interstitial game show. Main or regular programming, such as is broadcast on a given evening during prime time on a broadcast network would additionally include multiple interspersed, typically short, segments relating to game play. In the preferred embodiment, the game play would be for a relatively short period of time, for example, 1 to 2 minutes. For example, at 8:00 an initial round may be played prior to the beginning of prime time programming. Normal programming would then resume through the remainder of the 8:00 hour. At 9:00, a second short segment may be played. The play may continue at later times, such as to culminate at a show at 11:00. Preferably, the short segments would not necessarily be shown at a predetermined or predeterminable time as far as the audience was concerned. In that way, viewers who wish to see the progression of the game segments would need to continue viewing that channel, or at least, return to the channel fairly frequently. Optionally, the game play may be progressive from one interstitial game segment to another. Players may be presented with the option of stopping play or continuing.

In yet another game format, the show would include a display having an underlying image, with that image being at least partially obscured by overlying image regions which differ from the underlying image region. A contestant would be given a time limit in which they would be presented with information relating to a suggestion or a clue relating to an overlying image region, which if the player responded correctly, would be removed so as to reveal that portion of the underlying image which was below the overlying image. The suggestion or clues may be related to the underlying image or may merely be unrelated suggestions or clues with respect to that particular overlying image region.

Yet another embodiment of game play provides for the repurposing of an existing taped game show. The previously recorded game show would be segmented into subsets of issues, for example, presentation of questions or answers (as in the case of Jeopardy), those issues would be presented to one or more players, a response would be received from those players, and the answer would be compared to the correct answer. Scoring would then rank players relative to one another or to indicate the amount of the prize. In yet another game play implementation, one or more contestants would be presented with multiple images upon which predetermined data had been assembled. For example, images of five actresses may be presented to the player and the associated data would comprise opinion polling information as to whom the audience thought was the most attractive. The players would then play against each other to eliminate the images which they believe do not correspond to the most popular or number one response. The players would alternate until one player remained. In a second round, individual play, as opposed to play between contestants is utilized. Again, the player attempts to eliminate those answers which were other than the most popular answer of the audience.

In yet another aspect of enhanced game play, audience participation via an interactive video display, such as a computer connected over the Internet, or via an interactive television arrangement, may participate in the program.

Accordingly, it is an object of this series of inventions to provide for novel game play.

It is yet a further object of this invention to provide for enhanced modes of game play in association with existing forms of game play.

It is yet a further object of this invention to provide for the repurposing or repackaging of previously recorded game shows.

DETAILED DESCRIPTION OF THE PREFERRED EMBODIMENTS

Figure 1:
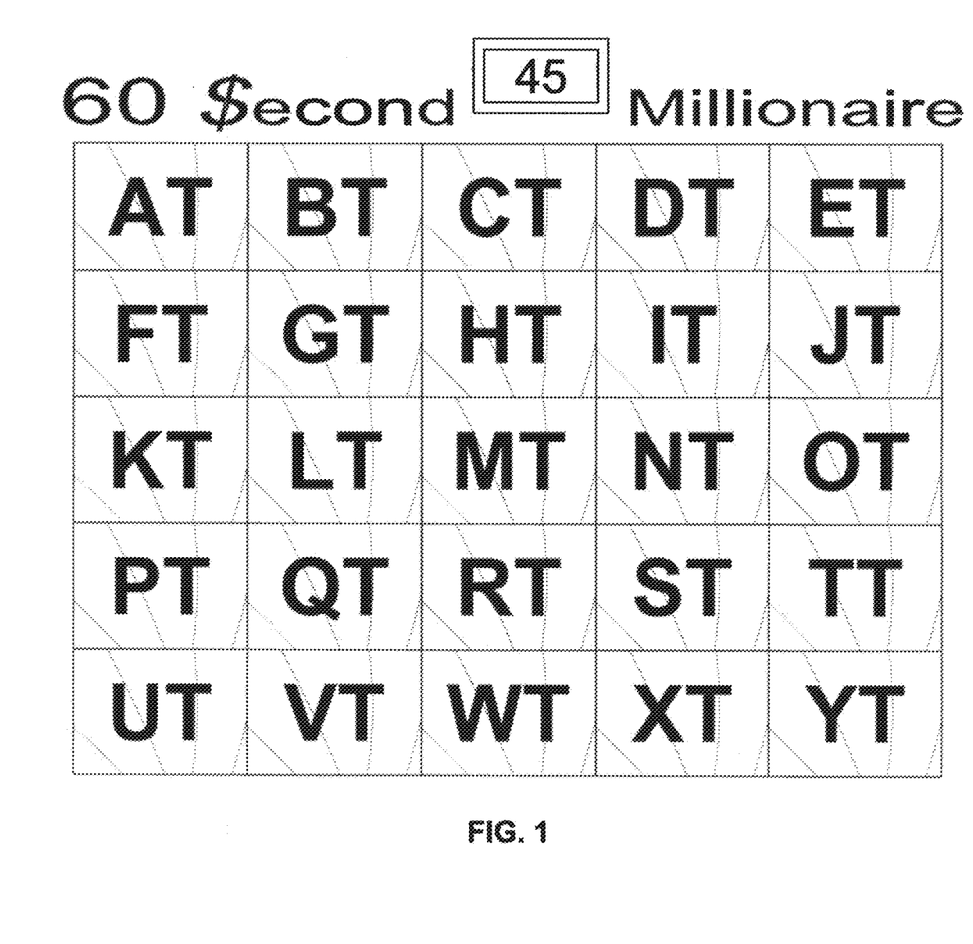
FIG. 1 shows the screen associated with an image presentation game in which obscuring portions are removed in response to correct answers.
Figure 2:
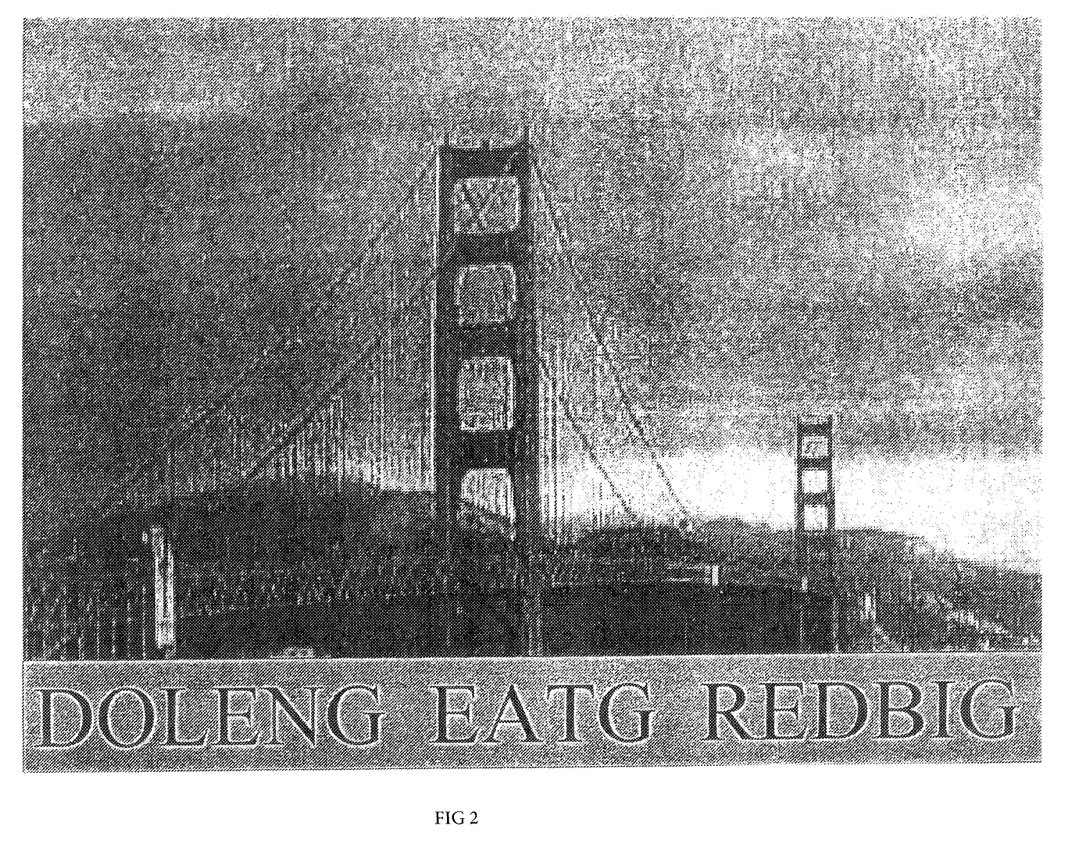
FIG. 2 is a drawing of an image with a word scramble.

FIG. 1 shows a screen image from a game show having a display with an underlying image. The title of the game, e.g., "60 $econd Millionaire" optionally involves a time limit and a time display. As shown, the time displayed is 45 seconds. An underlying image is obscured by one or more overlying images. As shown in FIG. 1, a 5×5 array of overlying obscuring images obscures the underlying images. As shown, there are three pairs of initials, AT in the upper left hand corner of the array, CT in the first row, third column and I-IT in the second row, third column. As the caller is presented with questions, they may answer and, if their answer is correct, the overlying obscuring piece corresponding to that answer or question is then removed, thereby reviewing the underlying image in the region where the overlying obscuring portion had previously been presented.

Various interactive game show formats and methods for game play are provided. In one embodiment, a second or ancillary game is played in parallel with a first or primary game. By way of example, in association with a first game comprising a lottery number ball draw, a second game may involve a selected player's guessing whether the next ball draw will be of a higher or lower number, or odd or even or the like.

Various aspects of enhanced game play and novel game are disclosed. In a first aspect, the game play method and system provides for the playing or running of a parallel game or ancillary game along with a first or primary game. For example, during the real time ball draw for a lottery, the improved game play would involve running a parallel or ancillary game along with the ball draw. One implementation would involve a first ball draw, followed then by game play by a contestant such as predicting whether the next ball drawn would be of a higher or lower number, or would be odd or even.

In one implementation, the master of ceremonies would advise the player which of these options had a better probability of being the outcome, thereby making the ancillary game more a game of chance as opposed to a game of skill. Optionally, scoring may be done, such as where one player or audience participant is scored or ranked relative to another player or participant.

In yet another aspect, the game play includes the use of contestant game play to determine lottery numbers. For example, a contestant may be blindfolded or otherwise be made unable to see various options. The person then selects from among the various options as the means by which the random lottery numbers are drawn. One example could comprise a blindfolded contestant selecting objects.

In yet another aspect, this invention relates to an interstitial game show. Main or regular programming, such as is broadcast on a given evening during prime time on a broadcast network would additionally include multiple interspersed, typically short, segments relating to game play. In the preferred embodiment, the game play would be for a relatively short period of time, for example, 1 to 2 minutes. For example, at 8:00 an initial round may be played prior to the beginning of prime time programming. Normal programming would then resume through the remainder of the 8:00 hour. At 9:00, a second short segment may be played. The play may continue at later times, such as to culminate at a show at 11:00. Preferably, the short segments would not necessarily be shown at a predetermined or predeterminable time as far as the audience was concerned. In that way, viewers who wish to see the progression of the game segments would need to continue viewing that channel, or at least, return to the channel fairly frequently. Optionally, the game play may be progressive from one interstitial game segment to another. Players may be presented with the option of stopping play or continuing.

In yet another game format, the show would include a display having an underlying image, with that image being at least partially obscured by overlying image regions which differ from the underlying image region. A contestant would be given a time limit in which they would be presented with information relating to a suggestion or a clue relating to an overlying image region, which if the player responded correctly, would be removed so as to reveal that portion of the underlying image which was below the overlying image. The suggestion or clues may be related to the underlying image or may merely be unrelated suggestions or clues with respect to that particular overlying image region.

Yet another embodiment of game play provides for the repurposing of an existing taped game show. The previously recorded game show would be segmented into subsets of issues, for example, presentation of questions or answers (as in the case of Jeopardy), those issues would be presented to one or more players, a response would be received from those players, and the answer would be compared to the correct answer. Scoring would then rank players relative to one another or to indicate the amount of the prize. In yet another game play implementation, one or more contestants would be presented with multiple images upon which predetermined data had been assembled. For example, images of five actresses may be presented to the player and the associated data would comprise opinion polling information as to whom the audience thought was the most attractive. The players would then play against each other to eliminate the images which they believe do not correspond to the most popular or number one response. The players would alternate until one player remained. In a second round, individual play, as opposed to play between contestants is utilized. Again, the player attempts to eliminate those answers which were other than the most popular answer of the audience.

In yet another aspect of enhanced game play, audience participation via an interactive video display, such as a computer connected over the Internet, or via an interactive television arrangement, may participate in the program.

Figure 3:
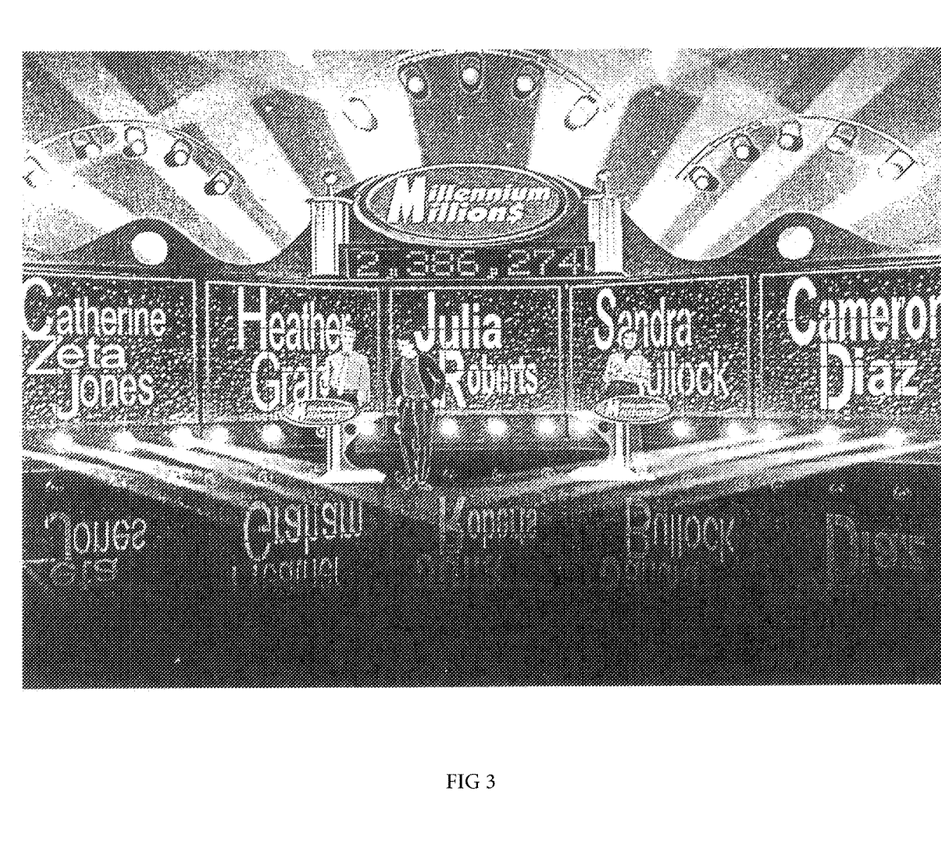
FIG. 3 is a depiction of a game show set for use with one version of the games disclosed herein.

The following comprises a detailed description of one implementation of a weekly game show utilizing various inventive aspects described herein. FIG. 3 shows a depiction of a possible set for the game show. Generally, two contestants and a Master of Ceremonies (MC) are placed at podiums. Large displays are provided on the set such that the in-studio audience may view the images. Optionally, the players may be additionally provided with monitors or other displays to aid in their viewing of the images. A display may be provided, such as to show the amount of money then available to be won, or to display other data, such as the number of participants still remaining. Such would be useful where there is significant audience participation, or participation by others via the internet or other computer based network.

Each week the show starts out with the introduction of the two contestants that will compete against each other and eventually have a chance to win, perhaps, the largest game show jackpot in television history.

We have thousands of telephone players that are also competing from home for their share of the money. These players have all called our telephone number during the week, and qualified to play on the program. On stage is a readout that shows the prize money building up, even during the broadcast. The phone players that remain in the game until the end of the show are patched in "live-on-tape" and have a shot at the money. For this example, let's assume that 25,000 people have qualified to participate in this week's show and the jackpot is up to $1.6 million.

Round One

The object of the studio game is to be the first player to reach $25,000 dollars. That player will go on to the end game for a chance to win thousands more, and perhaps hit the big jackpot! The first round starts with the in-studio players being asked an opinion question with 5 possible answers. Each of the 5 answers is displayed on a large video wall in a semi-circle onstage which creates the backdrop of our set. The first question is worth $1,000 dollars to the winner. For example:

Out of the following actresses, who is the sexiest?
Sandra Bullock, Elizabeth Hurley, Catherine Zeta Jones, Julia Roberts, Nicole Kidman.

The phone players vote for their favorite answer. The in-studio players take turns trying to eliminate the answers that they think are not the number 1 answer. The game is quite simply a kind of reverse "Family Feud." If a player mistakenly picks the number 1 answer, the opposing player will receive the $1,000 dollars. Additionally, if a player can successfully pick the last answer, leaving the number one answer, that player will receive the $1,000 dollars. The phone players who selected the number 1 answer are still in the game, and the others are eliminated. The studio players are shown another question worth $2,000 dollars and play continues in the same manner as before. Six questions in total are asked in the first round with the value going up by $1,000 dollars each time. The phone players are gradually whittled down to a few thousand by the end of the six questions.

Round Two—The Qualifying Round

This time the questions are played individually by a player instead of alternating between players. The player that is behind goes first. As before, a player must eliminate everything but the number 1 answer. For the first question, we stake a bank with $1,000 dollars. Every successful elimination will add $1,000 dollars to the bank. If the player eliminates every answer but the number 1 answer, they receive the money that has been built up in the bank. At any point the player mistakenly picks the number 1 answer, his/her opponent will get the money in the bank. The $2^{nd}$ question starts with a $2,000 dollar stake in the bank and each successful elimination adds $2,000 to the bank. The $3^{rd}$ question starts with 3000 and so on and so forth. The player that crosses the $25,000 dollar goal first will win the competition. The losing player gets parting gifts and does not keep the money accumulated during the game. Like the previous round, phone players who have picked the number 1 answer in this round will advance to the next round.

Speed Round

The speed round is played by the winning player. The player tries to answer as many questions as they can in sixty seconds. The questions always have two possible answers. For example:

Who was a better President?
Clinton or Reagan . . .
Have you eaten pizza in the last week?
Yes or no . . .
Have you ever milked a cow?
Yes or no . . .

As before, the phone players that give the majority answer will stay in the game. The first successful answer is worth $10,000 dollars to the in-studio player. If he/she gets the next question right, it is worth an additional $20,000 dollars, the next an additional $30,000 and so on. If the player guesses incorrectly, the total amount of money that they have accumulated up to that point is cut in half, and the next question starts back at the $10,000 dollar base amount. The player must then try to build back up his/her money. Let's assume, for example sake that at the end of the sixty seconds, the player has built up $120,000 dollars. We will also assume that there are 5 phone players left in the game.

The Final Challenge

At this point, the player is faced with a decision. He/she is shown a final question. For example:

Who would you rather have dinner with?
Bill Clinton, Bill Gates, Howard Stern, Robin Williams or Steven Spielberg?

The question was posed to a previously selected group in order to get the results.

The player can either stop and keep the money, or try for the jackpot. All the player must do is simply pick the number 1 answer.

If the player stops, he/she keeps 50% of the money that they have accumulated so far and we will split the remaining 50% amongst the phone players. We will speak to some of the players on the phone to find out whether they think the player should go for it or not. If the player decides to play for the jackpot, the phone players must also decide if they want to go for it too. Any phone player that does not wish to play can opt out of the game and keep their share of the money won thus far.

After the player decides what answer he/she believes is the number 1 answer, the host starts dramatically revealing the other answers one at a time until we get down to a 50-50 shot of winning. Then we see the players answer.

If the player wins, he/she will win 50% of the jackpot and the remaining phone players will win 50%. If the player loses, he/she will lose everything along with the phone players that participated and they will all receive parting gifts. The jackpot will then roll over to next week's show. When the jackpot is not hit for several weeks, the excitement level for the viewers and players will be incredible!

Although the foregoing invention has been described in some detail by way of illustration and example for purposes of clarity and understanding, it will be readily apparent to those of ordinary skill in the art in light of the teachings of this invention that certain changes and modifications may be made thereto without departing from the spirit or scope of the appended claims.

What is claimed:

1. A method for repurposing, a previously recorded game show, the previously recorded game show including presentation of a series of question and answer couplets, the series of question and answer couplets being communicated to more than one participant in the repurposed game show via one or more interactive video displays, comprising the steps of:

forming subsets of the previously recorded game show by segmenting the previously recorded game show into issues, each issue having at least one associated question and answer couplet, providing a first game comprising, the steps of:

(1) presenting on the one or more interactive video displays a question or answer relating to at least one issue to multiple players, (2) receiving responses relating to at least one issue from the players,
(3) processing the responses by comparing the responses to the correct answer or question from the previously recorded game show, and
(4) scoring the answer by:
  providing an instant positive reward to those players whose responses matched the correct answer from the previously recorded game show, and
  eliminating those players whose responses did not match the correct answer from the previously recorded game show, and
in parallel with the first game, providing a second, ancillary game wherein the players provide a response relative to an event in the first game.

2. The method for repurposing a previously recorded game show of claim 1 wherein the issue comprises a subset of issues.

3. The method for repurposing a previously recorded game show of claim 2 wherein the subissue comprises a question.

4. The method for repurposing a previously recorded game show of claim 2 wherein the subissue comprises an answer.

5. The method for repurposing a previously recorded game show of claim 1 wherein the issues are presented to one player.

6. The method for repurposing a previously recorded game show of claim 1 wherein the issues are presented to more than one player.

7. The method for repurposing a previously recorded game show of claim 6 wherein players are ranked relative to one another.

8. The method for repurposing a previously recorded game show of claim 1 wherein scoring comprises ranking the players relative to one another.

9. The method for repurposing a previously recorded game show of claim 1 wherein the scoring comprises indicating the amount of the prize.

10. The method for repurposing a previously recorded game show of claim 1 wherein the players participate via an interactive video display.

11. The method for repurposing a previously recorded game show of claim 1 wherein players participate via the internet.

12. The method for repurposing a previously recorded game show of claim 1 wherein the players participate via a computer based network.

13. The method for repurposing a previously recorded game show of claim 1 wherein in conjunction with the second game, the player is advised as to probabilities in the second game.

* * * * *